(12) United States Patent
Edwards

(10) Patent No.: US 12,366,716 B2
(45) Date of Patent: *Jul. 22, 2025

(54) DETECTION OF SINGLE POINTS OF FAILURE IN MULTIPLE SHARED RISK LINK GROUPS

(71) Applicant: MICROSOFT TECHNOLOGY LICENSING, LLC, Redmond, WA (US)

(72) Inventor: Kyle Louis Edwards, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/645,289

(22) Filed: Apr. 24, 2024

(65) Prior Publication Data

US 2024/0280775 A1    Aug. 22, 2024

Related U.S. Application Data

(63) Continuation of application No. 17/458,446, filed on Aug. 26, 2021, now Pat. No. 12,001,071.

(51) Int. Cl.
*G02F 1/00* (2006.01)
*G02B 6/38* (2006.01)
(Continued)

(52) U.S. Cl.
CPC .......... *G02B 6/4427* (2013.01); *G02B 6/381* (2013.01); *H04B 10/03* (2013.01); *H04B 10/27* (2013.01); *H04L 45/28* (2013.01)

(58) Field of Classification Search
CPC .... H04B 10/03; H04B 10/032; H04B 10/035; H04B 10/038; H04B 10/0795; H04B 10/0793; H04B 10/07953; H04B 10/27; H04J 14/02; H04Q 11/0005; H04Q 11/0066; H04Q 11/0067; H04L 45/28; G02B 6/4427; G02B 6/381
(Continued)

(56) References Cited

U.S. PATENT DOCUMENTS

| 12,001,071 B2 * | 6/2024 | Edwards ................. G02B 6/381 |
| 2012/0014690 A1 * | 1/2012 | Gruber ............. H04B 10/07951 398/25 |
| 2017/0063658 A1 * | 3/2017 | Ashwood-Smith ..... H04L 45/22 |

OTHER PUBLICATIONS

Communication under Rule 71(3) EPC Received for European Application No. 22773039.7, mailed on Apr. 11, 2025, 07 pages.

* cited by examiner

*Primary Examiner* — Hanh Phan
(74) *Attorney, Agent, or Firm* — Han Gim; Newport IP, LLC

(57) ABSTRACT

Rectangular equidistant projection is applied to coordinates for path fragments of a plurality of fiber optic routes. A bounding box is generated for each path fragment. For each cell of a grid of cells where its bounding box overlaps with a bounding box created by the cell, each path fragment is placed into the cell of the global grid. For any cell with more than one path fragment, each path fragment inside the cell is compared to every other path fragment in that cell. For any path fragment with overlapping bounding boxes, the length of the overlap is saved. A table of cumulative overlap distances between path fragments is generated to identify overlapping segments and cumulative lengths of the overlap distances.

20 Claims, 7 Drawing Sheets

(51) Int. Cl.
*G02B 6/44* (2006.01)
*H04B 10/03* (2013.01)
*H04B 10/27* (2013.01)
*H04L 45/28* (2022.01)

(58) Field of Classification Search
USPC ....... 398/1, 2, 3, 4, 5, 6, 7, 8, 9, 10, 13, 17, 398/25, 26, 27, 33, 34, 38, 79, 158, 159, 398/45, 48, 49, 66, 67, 68, 69, 59; 370/216, 217, 225, 228, 252, 401
See application file for complete search history.

DETECTION OF SINGLE POINTS OF FAILURE IN MULTIPLE SHARED RISK LINK GROUPS

CROSS-REFERENCE TO RELATED APPLICATION

This application is a continuation of U.S. patent application Ser. No. 17/458,446, filed Aug. 26, 2021, the contents of which are expressly incorporation herein by reference in their entirety.

BACKGROUND

A service provider may, for example, provide computing services to businesses and individuals as a remote computing service or provide "software as a service" (e.g., cloud computing). A service provider may utilize fiber optic networks within a data center, between data centers, and to communicate with other networks. Fiber optic networks typically carry data for multiple end-to-end links.

It is important to prevent downtime due to hardware, software, and network failures and other issues that may prevent the operation of services provided by the service provider. When a data center experiences connectivity issues or data transmission downtime, loss of data and services may occur, preventing users from providing quality services to their downstream customers, which may result in lost revenue and customer dissatisfaction. Production loss and inefficiencies with respect to computing resources can be exacerbated when the service provider is unable to quickly isolate and correct the cause of a data transmission problem.

It is with respect to these considerations and others that the disclosure made herein is presented.

SUMMARY

A Shared Risk Link Group (SRLG) is a way of identifying potential common failures in optical network routing. An SRLG is a segment where multiple links share a common resource. For example, when cables are bundled together or are commonly routed in the same physical space, an SRLG results because a cut or damage within the common span can take down all links that traverse that particular SRLG. An SRLG is typically associated with a numeric ID that is added to router links. The SRLG can be used in routing decisions and capacity simulations to avoid or minimize the risk of a single point of failure.

However, it is difficult to determine which SRLGs can fail at the same time due to SRLGs sharing a segment that is susceptible to a common failure. For example, two SRLGs may be placed in physical proximity for at least part of their span. To identify SRLGs that share a common segment, it is necessary to identify mapping attributes for all SRLGs to identify areas of potential commonality. SRLGs for links going over a fiber route typically may have an associated KMZ (Google Earth) file or other notation for expressing geographic annotation and visualization that show the fiber's physical path. In order to identify potential SRLG single points of failure, overlapping fiber routes need to be identified by auditing/analyzing the KMZ data for overlaps. However, comprehensive analysis of such KMZ data for a service provider's networks can be computationally intensive and not amenable to parallel processing.

The disclosed embodiments describe technologies for enabling a comprehensive comparison of a provider's global fiber routes and SRLGs by breaking the comparison to manageable subtasks. A geographic tolerance is defined (e.g., 10 m). Paths within this tolerance are considered overlapping, even if they do not intersect directly. Each fiber path is divided into fragments with a maximum number of coordinates. This maximum can be configured to a number such as 50 coordinates. The coordinates can be transformed so that antemeridian crossings do not cause discontinuities for the analysis.

Rectangular equidistant projection is applied to each fragment's coordinates (x=lon*cos(lat), y=lat). The distance of overlap is determined and therefore it is not necessary to preserve compass headings relative to different coordinates. A bounding box is created for each path fragment, which is expanded by the tolerance value. A global grid of 5 degree by 5 degree cells is then created from −180.0,90.0 to 180.0,−90.0 degrees. This segmentation allows for the coordinate space to be divided into manageable portions that can facilitate parallelization.

Each fragment is then placed into any 5×5 cell where its bounding box overlaps with the box created by the respective cell. For any 5×5 cell with more than one fragment, each fragment inside the cell is compared to every other fragment. For any path fragment that has overlapping bounding boxes, the overlap length is saved, represented as path a-path b. This is performed by transforming the coordinates of path a so that it becomes the origin, and performing polar rotation where theta=a tan 2(y,x). The length of overlap is the distance for which y is within the defined tolerance. After saving all the overlapping lengths, a table of cumulative overlap distances between paths/SRLGs is generated to identify overlapping segments and the cumulative lengths of the overlap. The overlaps can be used for routing decisions or changes to the placement of optical infrastructure.

By providing a way to efficiently identify SRLGs, the risk of damage and degradation or loss of data and expensive efforts to recover the degraded or lost channels may be avoided. Furthermore, by efficiently identifying SRLGs without extensive analysis and computation, the higher costs of repairing the physical network due to physical events can be avoided. Maintaining the availability and integrity of data is crucial for managing optical networks, and the described techniques can enable a cost-effective way to achieve such objectives.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The disclosed embodiments describe technologies for enabling a comprehensive comparison of a provider's global fiber routes and SRLGs by breaking the comparison to manageable subtasks.

An SRLG is a segment where multiple links share a common resource. For example, when cables are bundled together or are commonly routed in the same physical space, an SRLG results because a cut or damage within the common span can take down all links that traverse that particular SRLG. An SRLG is typically associated with a numeric ID that is added to router links. The SRLG can be used in routing decisions and capacity simulations to avoid or minimize the risk of a single point of failure.

However, to identify SRLGs that share a common segment, it is necessary to identify mapping attributes for all SRLGs to identify areas of potential commonality. SRLGs for links going over a fiber route typically may have an associated mapping file such as a KMZ file or other notation for expressing geographic annotation and visualization that show the fiber's physical path. A KMZ file may include a Keyhole Markup Language (KML) file which is a notation for geographic annotation and visualization. In order to identify potential SRLG single points of failure, overlapping fiber routes need to be identified by auditing/analyzing the KMZ data for overlaps. However, comprehensive analysis of such KMZ data for a service provider's networks can be computationally intensive and not amenable to parallel processing.

For example, a fiber path may be represented by a set of Linestrings, where a Linestring may be a one-dimensional object representing a sequence of points and the line segments connecting them. A service provider may have thousands of such paths in production, which may be represented by gigabytes of data. The service provider would need to find any instances of paths crossing/overlapping, which are not otherwise documented. The service provider may thus need to potentially perform millions of path-to-path comparisons where each path can be 40 Mb or more.

Figure 1:
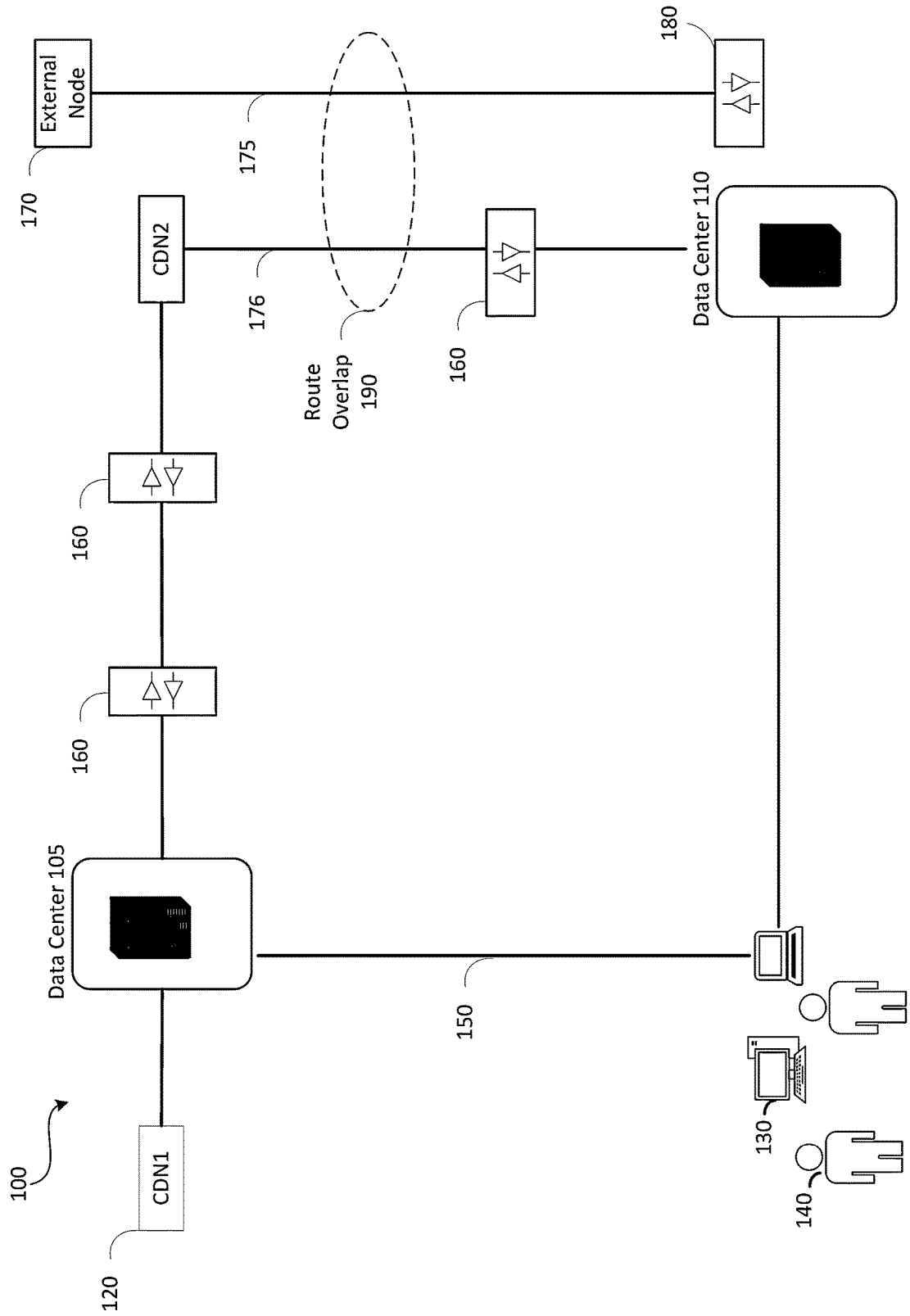
FIG. 1 is a diagram illustrating an example environment in accordance with the present disclosure.

FIG. 1 illustrates an example environment 100 in which embodiments of the disclosure may be implemented. Data centers 105 and 110 may be connected by a fiber optic network 150, and may provide computing resources to users 140 (which may be referred herein singularly as "a user 140" or in the plural as "the users 140") accessing the computing resources using client computers 130 (which may be referred herein singularly as "a computer 130" or in the plural as "the computers 130"). The computing resources provided by the data centers 105 and 110 may include various types of resources, such as computing resources, data storage resources, data communication resources, and the like. Data centers 105 and 110 may further allow distribution networks 120 to provide access to computing resources. Depending on physical distances, nodes 160 may be installed at various points in the network. In some embodiments, nodes 160 may be optical add-drop nodes or multiplexers. The optical add-drop nodes or multiplexers may be configured to add or drop one or more new wavelength channels to/from an existing multi-wavelength wavelength-division multiplexing (WDM) signal. An optical add-drop node or multiplexer can be used to insert, remove, or route channels to increase network flexibility. In FIG. 1, an external node 170 and node 180 may be connected via a cable 175 that has a route overlap 190 with cable 176. Although not physically bundled together, the cables may be co-located within a threshold distance to be considered overlapping and thus determined to be a SRLG.

The disclosed embodiments describe techniques for enabling a comprehensive comparison of a service provider's global fiber routes and SRLGs by breaking the comparison to manageable subtasks. In an embodiment, a geographic tolerance may be defined. Paths within this tolerance may be considered overlapping, even if they do not intersect directly. The tolerance can be any value that may be selected based on the desired level of risk, the types of damage scenarios, and other factors. For example, a value of 10 meters may be used, which can account for situations where a large vehicle or a fire can cause damage to paths that are within this distance.

Each fiber path may be divided into fragments with a maximum number of coordinates. This maximum can be configured to a number such as 50 coordinates. The coordinates can be transformed so that antemeridian crossings do not cause discontinuities for the analysis. For example, a line segment crossing from −179.9 to 179.8 can be broken into two line fragments.

Figure 2:
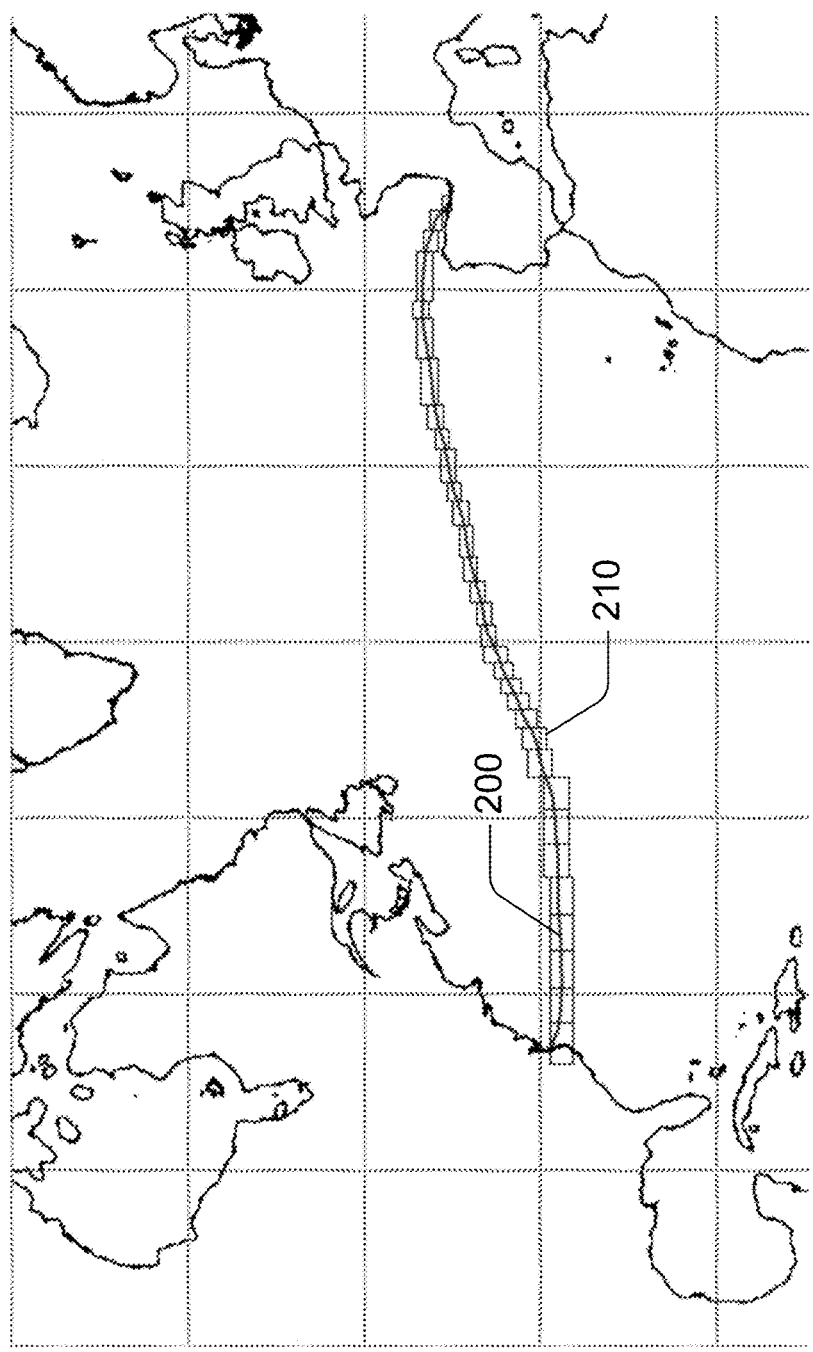
FIG. 2 is an example coordinate space in accordance with the present disclosure.

Rectangular equidistant projection may be applied to each fragment's coordinates (x=lon*cos(lat), y=lat). The distance of overlap may be determined and therefore it is not necessary to preserve compass headings relative to different coordinates. A bounding box may be created for each path fragment, which may be expanded by the tolerance value. A global grid of 5 degree by 5 degree cells may then created from −180.0,90.0 to 180.0,−90.0 degrees. This segmentation allows for the coordinate space to be divided into manageable portions that can facilitate parallelization. FIG. 2 illustrates the coordinate space in equidistant rectangular projection, with a path 200 broken into fragments 210.

Each fragment may then be placed into any 5×5 cell where its bounding box overlaps with the box created by the respective cell. For any 5×5 cell with more than one fragment, each fragment inside the cell may be compared to every other fragment. For any path fragment that has overlapping bounding boxes, the overlap length is saved, represented as path a-path b. This is performed by transforming the coordinates of path a so that it becomes the origin, and performing polar rotation where theta=a tan 2(y,x). The length of overlap is the distance for which y is within the defined tolerance. For example:

For each cell
  For each path fragment 1
    For each path fragment 2
      If path fragment 1 and path fragment 2 have overlapping bounding boxes
        For each line segment in path fragment 1
        For each line segment in path fragment 2
Save any distance of overlap, or intersection between the two line segments in an overlap representing path1-path2

Figure 3:
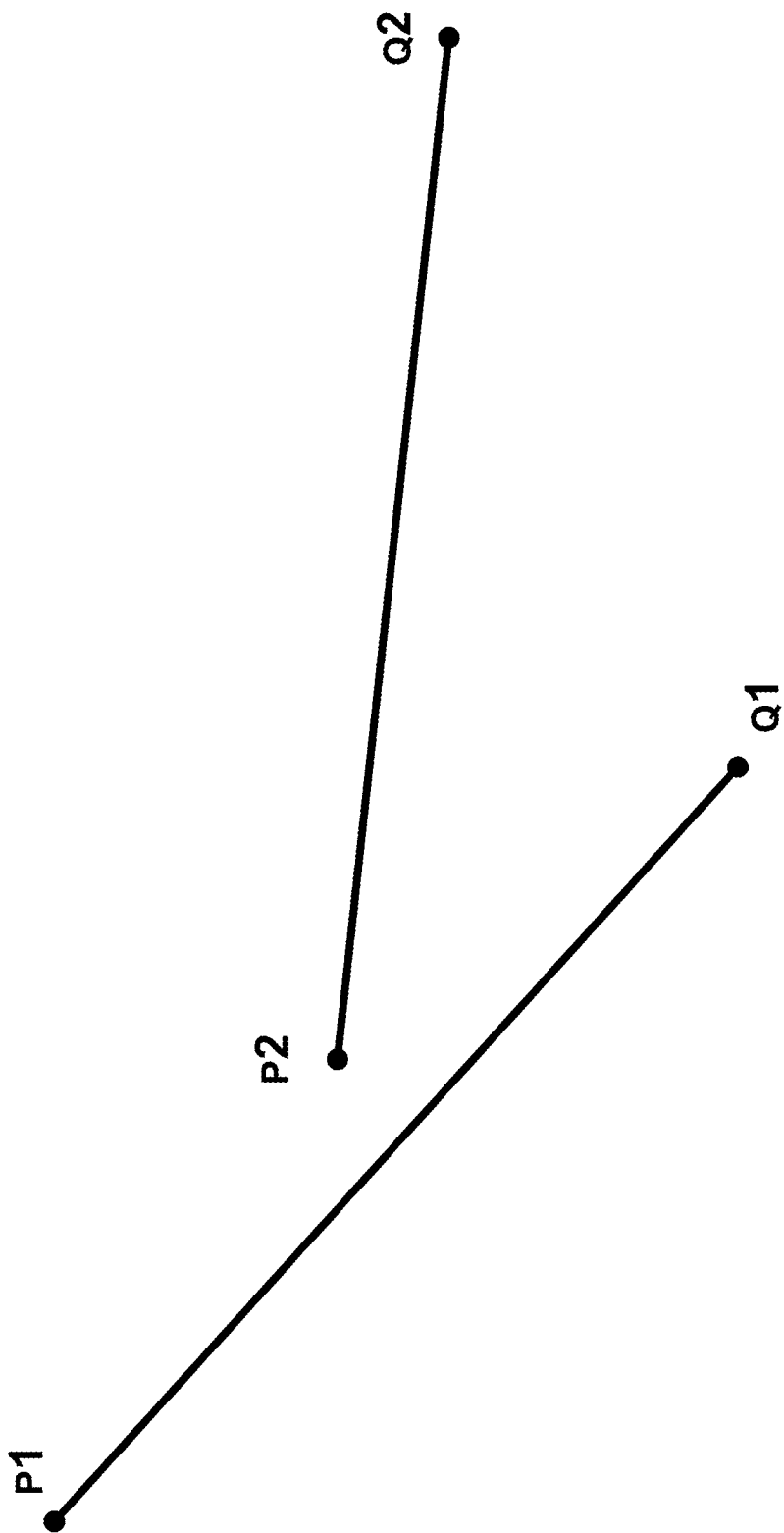
FIG. 3 is an example of determining overlap in accordance with the present disclosure.

With reference to FIG. 3, to determine if two line segments overlap:

Line segment from lower number SRLG/Path ID is the Reference Line (p1-q1)

Line segment from higher number SRLG/Path ID is the Comparison line (p2-q2)

Figure 4:
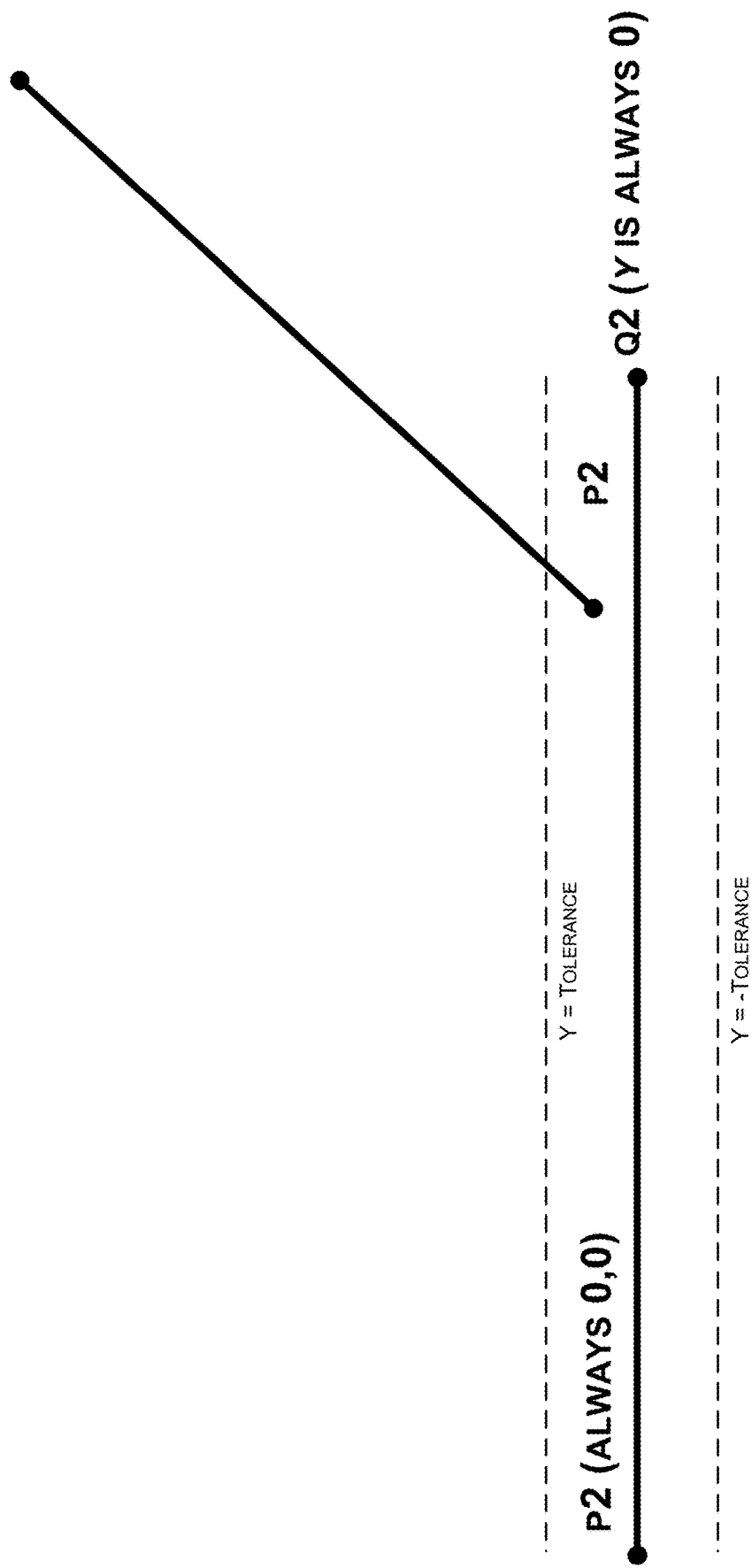
FIG. 4 is an example line overlap approach in accordance with the present disclosure.

With reference to FIG. 4, illustrated is an example line overlap approach. The coordinates can be transformed so that p1 becomes the origin. Polar rotation can be performed where theta=a tan 2(q2·y, q2·x). The length of p2-q2 line can be determined where Y is between tolerance and −tolerance. Any intersection between p2-q2 and p1-q1 can also be saved. If any overlap or intersection is found, the original p2-q2 line segment can also be saved in an overlap representing the pair of paths/SRLGs.

After saving all the overlapping lengths, a table of cumulative overlap distances between paths/SRLGs may be generated to identify overlapping segments and the cumulative lengths of the overlap. The overlaps can be used for routing decisions or changes to the placement of optical infrastructure.

In some embodiments, the described techniques may be provided as a service that is accessible via a user interface. Such a user interface may be provided on a user computing device. The user interface 360 may be provided in conjunction with an application that communicates to one or more systems that provide analysis and detection of SRLG points of failure. Some embodiments may use an API It should be appreciated that the examples described above are merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing or networking device may comprise any combination of hardware or software that can interact and perform the described types of functionality, including without limitation desktop or other computers, database servers, network storage devices and other network devices, tablets, intermediate networking devices, and various other devices that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 5:
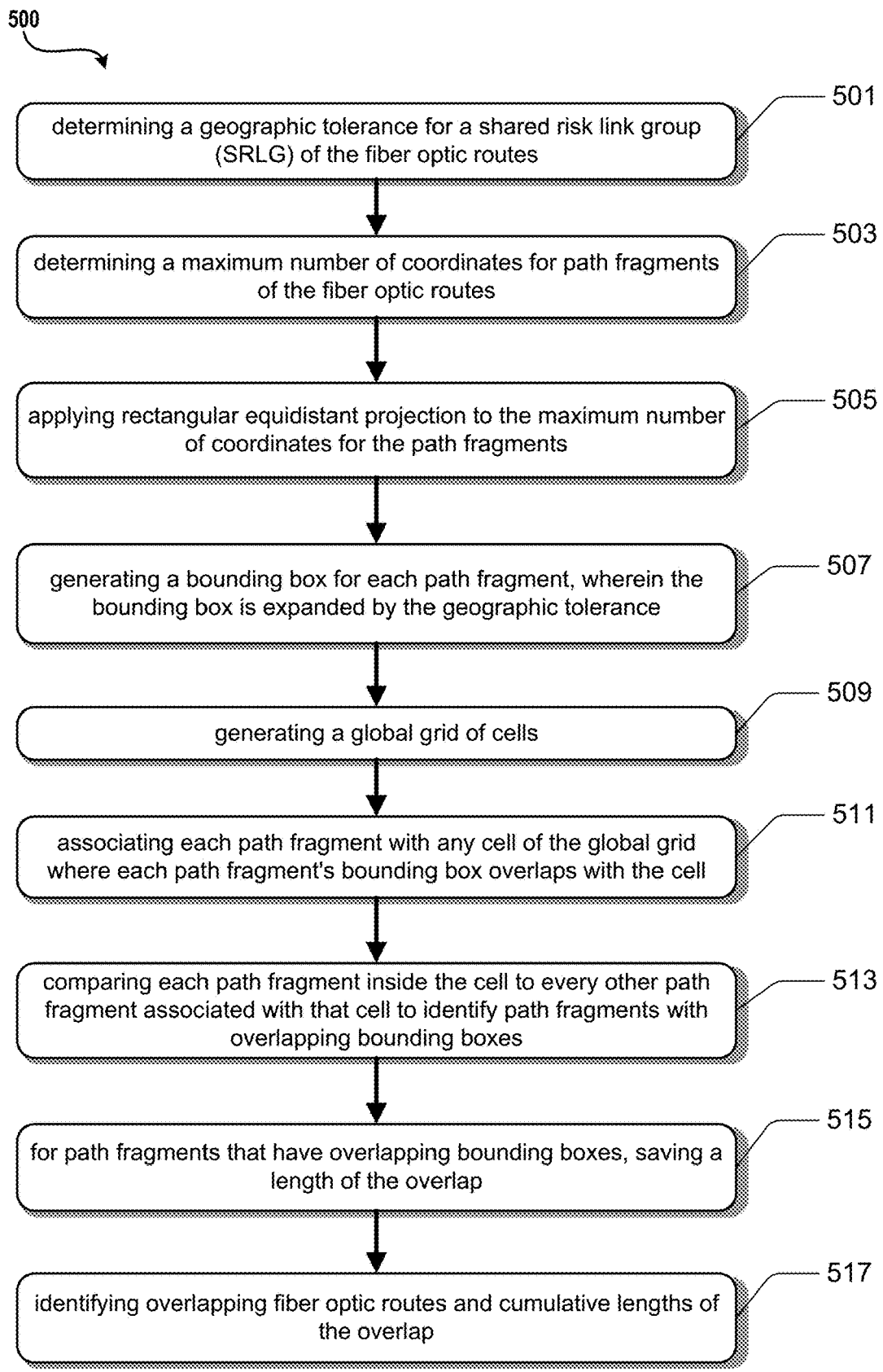
FIG. 5 is a flowchart depicting an example procedure in accordance with the present disclosure.

Turning now to FIG. 5, illustrated is an example flowchart for analyzing a plurality of fiber optic routes in accordance with the present disclosure. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 are described herein as being implemented, at least in part, by modules running the features disclosed herein and can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

The operations in FIG. 5 can be performed, for example, by a device configured to communicatively couple to an optical communications network. The optical communications network may include an optical transmission medium configured to transmit data signals on a plurality of optical signals carried on a plurality of optical wavelengths. The optical communications network may further comprise a plurality of optical data links interconnected by a plurality of switching nodes, the optical data links comprising a plurality of data channels, as described above with respect to any one of FIGS. 1-4.

Operation 501 illustrates determining a geographic tolerance for a shared risk link group (SRLG) of the fiber optic routes. Operation 501 may be followed by operation 503. Operation 503 illustrates determining a maximum number of coordinates for path fragments of the fiber optic routes. Operation 503 may be followed by operation 505. Operation 505 illustrates applying rectangular equidistant projection to the maximum number of coordinates for the path fragments. Operation 505 may be followed by operation 507. Operation 507 illustrates using the rectangular equidistant projection, generating a bounding box for each path fragment, wherein the bounding box is expanded by the geographic tolerance. Operation 507 may be followed by operation 509. Operation 509 illustrates generating a global grid of cells.

Operation 509 may be followed by operation 511. Operation 511 illustrates associating each path fragment with any cell of the global grid where each path fragment's bounding box overlaps with the cell. Operation 511 may be followed by operation 513. Operation 513 illustrates for any cell associated with more than one path fragment: comparing each path fragment inside the cell to every other path fragment associated with that cell to identify path fragments with overlapping bounding boxes. Operation 513 may be followed by operation 515. Operation 515 illustrates for path fragments that have overlapping bounding boxes, saving a length of the overlap, wherein the length is a distance for which a projected distance on a common reference plane is within the geographic tolerance. Operation 515 may be followed by operation 517. Operation 517 illustrates based on cumulative overlap distances between path fragments, identifying overlapping fiber optic routes and cumulative lengths of the overlap.

Figure 6:
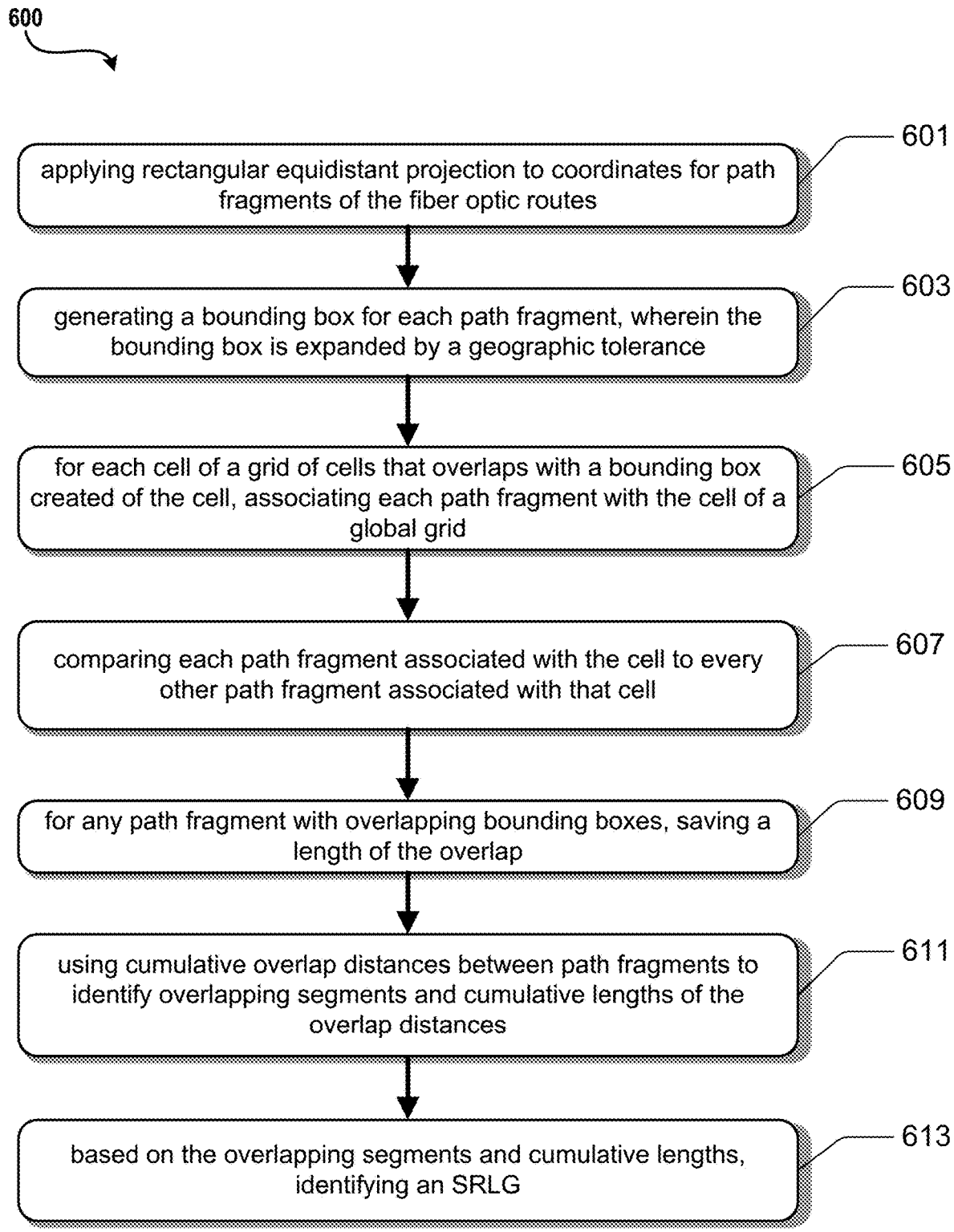
FIG. 6 is a flowchart depicting an example procedure in accordance with the present disclosure.

Turning now to FIG. 6, illustrated is an example operational procedure for managing SRLGs in accordance with the present disclosure. The operational procedure may be implemented in a system comprising a plurality of optical data links comprising a plurality of data channels and one or more switching nodes communicatively coupled to the plurality of optical data links. Referring to FIG. 6, operation 601 illustrates applying rectangular equidistant projection to coordinates for path fragments of the fiber optic routes.

Operation 601 may be followed by operation 603. Operation 603 illustrates based on the rectangular equidistant projection, generating a bounding box for each path fragment, wherein the bounding box is expanded by a geographic tolerance.

Operation 603 may be followed by operation 605. Operation 605 illustrates for each cell of a grid of cells that overlaps with a bounding box created of the cell, association each path fragment with the cell of a global grid.

Operation 605 may be followed by operation 607. Operation 607 illustrates for any cell associated with more than one path fragment: comparing each path fragment associated with the cell to every other path fragment associated with that cell.

Operation 607 may be followed by operation 609. Operation 609 illustrates for any path fragment with overlapping bounding boxes, saving a length of the overlap.

Operation 609 may be followed by operation 611. Operation 611 illustrates using cumulative overlap distances between path fragments to identify overlapping segments and cumulative lengths of the overlap distances.

Operation 611 may be followed by operation 613. Operation 613 illustrates based on the overlapping segments and cumulative lengths, identifying an SRLG.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 7:
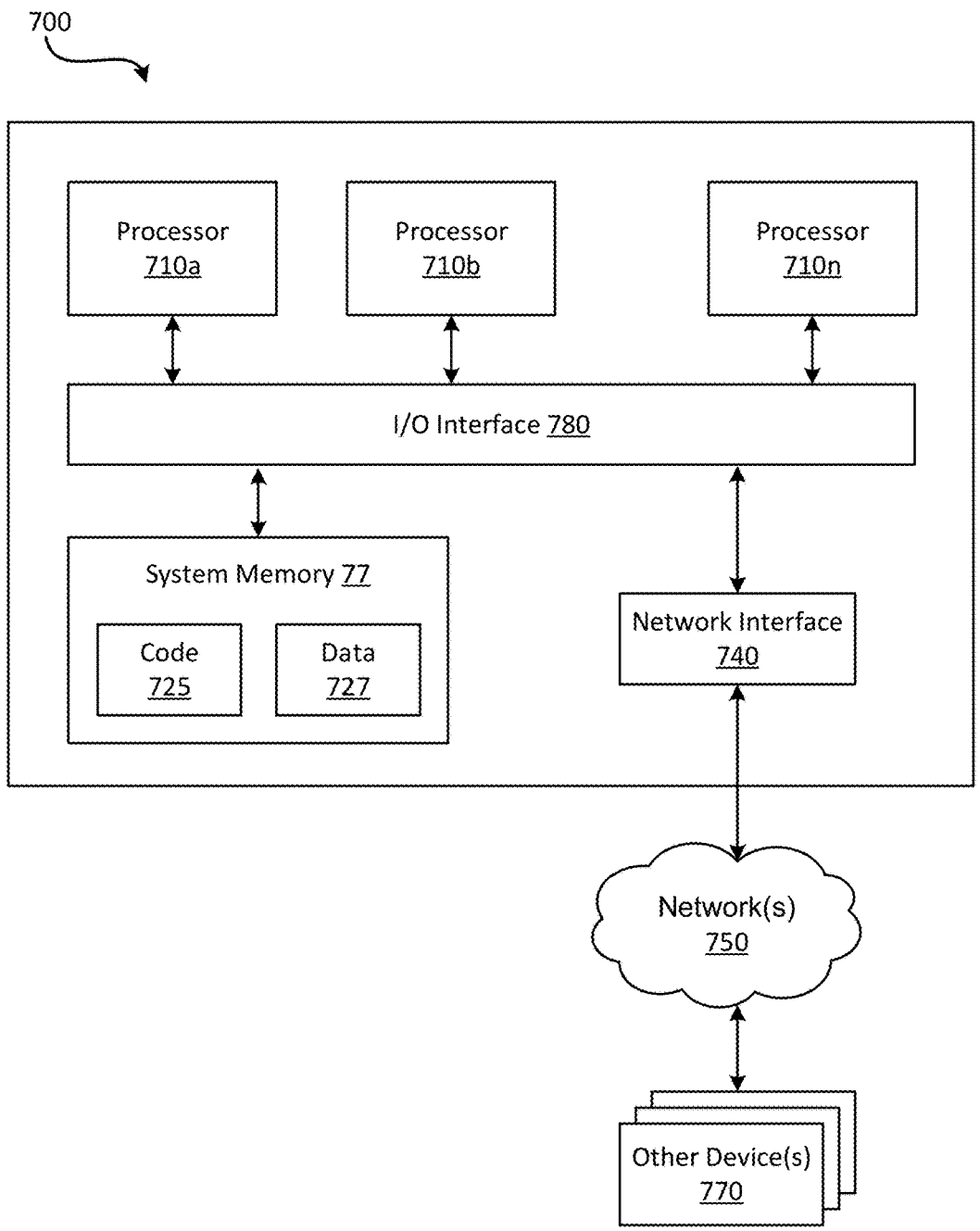
FIG. 7 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 7 illustrates such a general-purpose computing device 700. In the illustrated embodiment, computing device 700 includes one or more processors 710a, 710b, and/or 710n (which may be referred herein singularly as "a processor 710" or in the plural as "the processors 710") coupled to a system memory 77 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x77, PowerPC, SPARC, or MIPS ISAs, or any other suitable ISA. In multiprocessor systems, each of processors 710 may commonly, but not necessarily, implement the same ISA.

System memory 77 may be configured to store instructions and data accessible by processor(s) 710. In various embodiments, system memory 77 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 77 as code 725 and data 727.

In one embodiment, I/O interface 730 may be configured to coordinate I/O traffic between the processor 710, system memory 77, and any peripheral devices in the device, including network interface 740 or other peripheral interfaces. In some embodiments, I/O interface 730 may perform any necessary protocol, timing, or other data transformations to convert data signals from one component (e.g., system memory 77) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components. Also, in some embodiments some or all of the functionality of I/O interface 730, such as an interface to system memory 77, may be incorporated directly into processor 710.

Network interface 740 may be configured to allow data to be exchanged between computing device 700 and other device or devices 770 attached to a network or network(s) 750, such as other computer systems or devices as illustrated in FIGS. 1 through 4, for example. In various embodiments, network interface 740 may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fibre Channel SANs or via any other suitable type of network and/or protocol.

In some embodiments, system memory 77 may be one embodiment of a computer-accessible medium configured to store program instructions and data as described above for FIGS. 1-8 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 700 as system memory 77 or another type of memory. Further, a computer-accessible medium may include transmission media or signals such as electrical, electromagnetic or digital signals, conveyed via a communication medium such as a network and/or a wireless link, such as may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 7, may include other components that are not explicitly shown in FIG. 7, or may utilize an architecture completely different than that shown in FIG. 7.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1:

A system configured to analyze a plurality of fiber optic routes, the system comprising:
one or more processors; and
a memory in communication with the one or more processors, the memory having computer-readable instructions stored thereupon that, when executed by the one or more processors, cause the system to perform operations comprising:
determining a geographic tolerance for a shared risk link group (SRLG) of the fiber optic routes;
determining a maximum number of coordinates for path fragments of the fiber optic routes;
applying rectangular equidistant projection to the maximum number of coordinates for the path fragments;
using the rectangular equidistant projection, generating a bounding box for each path fragment, wherein the bounding box is expanded by the geographic tolerance;
generating a global grid of cells;
associating each path fragment with any cell of the global grid where each path fragment's bounding box overlaps with the cell;
for any cell associated with more than one path fragment:
comparing each path fragment inside the cell to every other path fragment associated with that cell to identify path fragments with overlapping bounding boxes; and
for path fragments that have overlapping bounding boxes, saving a length of the overlap, wherein the length is a distance for which a projected distance on a common reference plane is within the geographic tolerance; and
based on cumulative overlap distances between path fragments, identifying overlapping fiber optic routes and cumulative lengths of the overlap.

Clause 2: The system of clause 1, wherein the geographic tolerance is 10 meters.

Clause 3: The system of any of clauses 1-2, wherein the maximum number of coordinates is 50 coordinates.

Clause 4: The system of any of clauses 1-3, further comprising computer-readable instructions stored thereupon that, when executed by the one or more processors, cause the system to perform operations comprising transforming the coordinates so that antemeridian crossings do not cause discontinuities.

Clause 5: The system of any of clauses 1-4, wherein the rectangular equidistant projection comprises (x=lon*cos (lat), y=lat).

Clause 6: The system of any of clauses 1-5, wherein the global grid of cells is 5 degrees by 5 degrees from −180.0, 90.0 to 180.0,−90.0 degrees.

Clause 7: The system of any of clauses 1-5, wherein overlap lengths are determined by transforming coordinates of path a so that it becomes the origin, and performing polar rotation where theta=a tan 2(y, x).

Clause 8: A method for identifying a shared risk link group (SRLG) among a plurality of fiber optic routes, comprising:
applying rectangular equidistant projection to coordinates for path fragments of the fiber optic routes;
based on the rectangular equidistant projection, generating a bounding box for each path fragment, wherein the bounding box is expanded by a geographic tolerance;
for each cell of a grid of cells that overlaps with a bounding box created of the cell, association each path fragment with the cell of a global grid;
for any cell associated with more than one path fragment:
comparing each path fragment associated with the cell to every other path fragment associated with that cell; and
for any path fragment with overlapping bounding boxes, saving a length of the overlap;
using cumulative overlap distances between path fragments to identify overlapping segments and cumulative lengths of the overlap distances; and based on the overlapping segments and cumulative lengths, identifying an SRLG.

Clause 9: The method of clause 8, further comprising transforming the coordinates so that antemeridian crossings do not cause discontinuities.

Clause 10: The method of any of clauses 8 and 9, wherein the rectangular equidistant projection comprises (x=lon*cos (lat), y=lat).

Clause 11: The method of any clauses 8-10, wherein the global grid is 5 degrees by 5 degrees from −180.0,90.0 to 180.0,−90.0 degrees.

Clause 12: The method of any clauses 8-11, wherein overlap lengths are determined by transforming coordinates of path a so that it becomes the origin, and performing polar rotation where theta=a tan 2(y, x).

Clause 13: The method of any clauses 8-12, wherein the geographic tolerance is 10 meters.

Clause 14: The method of any clauses 7-12, wherein the maximum number of coordinates is 50 coordinates.

Clause 14: The method of any clauses 7-13, wherein flow splitting is performed by an intelligent ToR, on a source based on stable hashing, or directly on a source node.

Clause 15: A computer-readable storage medium having computer-executable instructions stored thereupon which, when executed by one or more processors of a computing device, cause the computing device to:
apply rectangular equidistant projection to coordinates for path fragments of a plurality of fiber optic routes;
based on the rectangular equidistant projection, generate a bounding box for each path fragment, wherein the bounding box is expanded by a geographic tolerance;
for each cell of a grid of cells where its bounding box overlaps with a bounding box created by the cell, associate each path fragment with the cell of a global grid;
for any cell with more than one path fragment, compare each path fragment inside the cell to every other path fragment in that cell;
for any path fragment with overlapping bounding boxes, store a length of the overlap; and
based on cumulative overlap distances between path fragments, identify overlapping segments and cumulative lengths of the overlap distances; and
based on the overlapping segments and cumulative lengths, identifying a shared risk link group.

Clause 16: The computer-readable storage medium of clause 15, further comprising computer-readable instructions that, when executed by the one or more processors, cause the computing device to transform the coordinates so that antemeridian crossings do not cause discontinuities.

Clause 17: The computer-readable storage medium of any of clauses 15 and 16, wherein the rectangular equidistant projection comprises (x=lon*cos(lat), y=lat).

Clause 18: The computer-readable storage medium of any of the clauses 15-17, further wherein the global grid is 5 degrees by 5 degrees from −180.0,90.0 to 180.0,−90.0 degrees.

Clause 19: The computer-readable storage medium of any of the clauses 15-18, wherein overlap lengths are determined by transforming coordinates of path a so that it becomes the origin, and performing polar rotation where theta=a tan 2(y, x).

Clause 20: The computer-readable storage medium of any of the clauses 15-19, wherein the geographic tolerance and the maximum number of coordinates are predetermined.

The invention claimed is:

1. A system configured to analyze a plurality of fiber optic routes, the system comprising:
one or more processors; and
a memory in communication with the one or more processors, the memory having computer-readable instructions stored thereupon that, when executed by the one or more processors, cause the system to perform operations comprising:
generating bounding boxes for path fragments of the fiber optic routes;
associating the path fragments with cells of a global grid of cells when the bounding boxes for the path fragments overlap with the cells;
for any cell associated with more than one path fragment:
comparing each path fragment inside the cell to every other path fragment associated with that cell to identify path fragments with overlapping bounding boxes; and
for the path fragments that have overlapping bounding boxes, saving a length of overlap, wherein the length is a distance for which a projected distance on a common reference plane is within a geographic tolerance; and
based on cumulative overlap distances between path fragments, identifying overlapping fiber optic routes and cumulative lengths of the overlap.

2. The system of claim 1, wherein the geographic tolerance is 10 meters.

3. The system of claim 1, computer-readable instructions stored thereupon that, when executed by the one or more processors, cause the system to perform operations comprising:
determining a maximum number of coordinates for path fragments of the fiber optic routes; and
applying rectangular equidistant projection to the maximum number of coordinates for the path fragments;
wherein the bounding boxes are generated using the rectangular equidistant projection.

4. The system of claim 3 further comprising computer-readable instructions stored thereupon that, when executed by the one or more processors, cause the system to perform operations comprising transforming the coordinates so that antemeridian crossings do not cause discontinuities.

5. The system of claim 3, wherein the rectangular equidistant projection comprises (x=lon*cos(lat), y=lat).

6. The system of claim 1, wherein the global grid of cells is 5 degrees by 5 degrees from −180.0,90.0 to 180.0,−90.0 degrees.

7. The system of claim 1, wherein overlap lengths are determined by transforming coordinates of path a so that the path a becomes an origin, and performing polar rotation where theta=a tan 2(y, x).

8. A method for identifying a shared risk link group (SRLG) among a plurality of fiber optic routes, comprising:
generating a bounding box for path fragments of the fiber optic routes;
for each cell of a grid of cells that overlaps with a bounding box created for each of the cells, associating path fragments with the cells that overlap;
for any cell associated with more than one path fragment:
comparing each path fragment associated with the cell to every other path fragment associated with that cell; and
for any path fragment with overlapping bounding boxes, saving a length of the overlap;

using cumulative overlap distances between path fragments to identify overlapping segments and cumulative lengths of the overlap distances; and based on the overlapping segments and cumulative lengths, identifying a shared risk link group (SRLG).

9. The method of claim 8, further comprising transforming coordinates for the path fragments so that antemeridian crossings do not cause discontinuities.

10. The method of claim 8, further comprising:
applying rectangular equidistant projection to coordinates for path fragments of the fiber optic routes;
wherein the bounding boxes are generated based on the rectangular equidistant projection;
wherein the rectangular equidistant projection comprises (x=lon*cos(lat), y=lat).

11. The method of claim 8, wherein the grid is 5 degrees by 5 degrees from −180.0,90.0 to 180.0,−90.0 degrees.

12. The method of claim 8, wherein the overlap lengths are determined by transforming coordinates of path a so that path a becomes an origin, and performing polar rotation where theta=a tan 2(y, x).

13. The method of claim 8, wherein the bounding box is expanded by a geographic tolerance.

14. The method of claim 8, wherein a maximum number of coordinates for path fragments of the fiber optic routes is 50 coordinates.

15. A computer-readable storage medium having computer-executable instructions stored thereupon which, when executed by one or more processors of a computing device, cause the computing device to:
generate a bounding box for path fragments of a plurality of fiber optic routes;
for each cell of a global grid of cells in which bounding boxes overlap, associate path fragments with the cell;
for any cell with more than one associated path fragment, compare each path fragment inside the cell to every other path fragment in that cell;
for any path fragment with overlapping bounding boxes, store a length of the overlap; and
based on cumulative overlap distances between path fragments, identify overlapping segments and cumulative lengths of the overlap distances; and
based on the overlapping segments and cumulative lengths, identifying a shared risk link group.

16. The computer-readable storage medium of claim 15, further comprising computer-readable instructions that, when executed by the one or more processors, cause the computing device to transform coordinates of the path fragments so that antemeridian crossings do not cause discontinuities.

17. The computer-readable storage medium of claim 15, further comprising computer-executable instructions stored thereupon which, when executed by one or more processors of a computing device, cause the computing device to:
apply rectangular equidistant projection to coordinates for path fragments of a plurality of fiber optic routes;
wherein the bounding boxes are generated based on the rectangular equidistant projection.

18. The computer-readable storage medium of claim 17, wherein a geographic tolerance for the bounding boxes and a maximum number of coordinates for the path fragments are predetermined.

19. The computer-readable storage medium of claim 15, wherein the global grid is 5 degrees by 5 degrees from −180.0,90.0 to 180.0,−90.0 degrees.

20. The computer-readable storage medium of claim 15, wherein overlap lengths are determined by transforming coordinates of path a so that path a becomes an origin and performing polar rotation where theta=a tan 2(y, x).

* * * * *